United States Patent
Gao et al.

(10) Patent No.: US 11,195,400 B2
(45) Date of Patent: Dec. 7, 2021

(54) SMOKE DETECTOR AND METHOD FOR DETECTING SMOKE

(71) Applicant: Jade Bird Fire Co., Ltd., Beijing (CN)

(72) Inventors: Ying Gao, Beijing (CN); Chaoping Liu, Beijing (CN); Kewei Bi, Beijing (CN); Cong Wang, Beijing (CN)

(73) Assignee: Jade Bird Fire Co., Ltd., Beijing (CN)

( * ) Notice: Subject to any disclaimer, the term of this patent is extended or adjusted under 35 U.S.C. 154(b) by 0 days.

(21) Appl. No.: 16/795,772

(22) Filed: Feb. 20, 2020

(65) Prior Publication Data
US 2020/0265697 A1  Aug. 20, 2020

(30) Foreign Application Priority Data

Feb. 20, 2019  (CN) .......................... 201910126962.4
Feb. 20, 2019  (CN) .......................... 201920216711.0

(51) Int. Cl.
*G08B 17/107*  (2006.01)
*G01N 21/53*  (2006.01)
*G08B 25/01*  (2006.01)
*G08B 17/113*  (2006.01)

(52) U.S. Cl.
CPC ........... *G08B 17/107* (2013.01); *G01N 21/53* (2013.01); *G08B 17/113* (2013.01); *G08B 25/01* (2013.01)

(58) Field of Classification Search
CPC .... G08B 17/107; G08B 17/10; G08B 17/103; G08B 17/113; G08B 25/01; G08B 29/26; G01N 15/0205; G01N 15/1434; G01N 15/1459; G01N 21/53; G01N 21/538; G01N 15/10; G01N 2201/061; G01N 2201/062; G01N 2201/0621; G01N 2201/0627; G01N 2201/0633; G01N 2201/0696; G01N 21/00; G01N 21/17; G01N 21/47; G01N 21/49; G01N 21/532; G01N 21/534; G01N 15/06; G01N 2015/0693; G01N 2021/4733; H01L 29/0657; H01L 29/045; H01L 29/1029; H01L 29/1037; H01L 29/7786;
(Continued)

(56) References Cited

U.S. PATENT DOCUMENTS 9,448,168 B2 * 9/2016 Knox ................. G01N 15/1459
10,816,939 B1 * 10/2020 Coleman ................. G01S 17/86
2018/0061215 A1 * 3/2018 Vollenweider ....... G08B 17/117

* cited by examiner

*Primary Examiner* — Hai Phan
*Assistant Examiner* — Anthony D Afrifa-Kyei
(74) *Attorney, Agent, or Firm* — Meunier Carlin & Curfman LLC

(57) ABSTRACT

A smoke detector comprising a body, having a detection chamber therein; a first transmitting tube and a second transmitting tube, arranged in the body and configured to be capable of transmitting a first ray of light and a second ray of light into the detection chamber, respectively; a receiving tube, where the first ray of light and the second ray of light can be incident after refraction and/or scattering, and which generates outputs according to the intensity of incident light; and a control device, coupled with the receiving tube to receive a first output generated by the first ray of light on the receiving tube and a second output generated by the second ray of light on the receiving tube, and configured to determine whether there is a fire based on a difference or ratio between the first output and the second output, or the combination thereof.

20 Claims, 5 Drawing Sheets

(58) Field of Classification Search
CPC ............... H01L 29/872; H01L 29/1066; H01L 29/2003; H01L 29/42356; G01F 1/667
See application file for complete search history.

SMOKE DETECTOR AND METHOD FOR DETECTING SMOKE

RELATED APPLICATION

This application claims priority to, and the benefit of, Chinese Patent Application No. CN2019202167110, filed on Feb. 20, 2019, and CN2019101269624, filed on Feb. 20, 2019, each of which is incorporated by reference herein in its entirety.

TECHNICAL FIELD

The present invention relates to the technical field of smoke detection, and, more especially, to a smoke detector using two or more transmitting tubes and a method for detecting smoke.

BACKGROUND

Fire is a serious combustion phenomenon that spreads out of control, one of various disasters that occurs most frequently and causes widespread devastation. Smoke is one of the major products of fire in the early stage, which is often used as a reference factor to detect fire. Three basic parameters of smoke are mainly focused on, including concentration, average particle size and dimensional analysis. Among others, the concentration of smoke directly reflects the amount of smoke, the decrease in visibility and the level of hazard.

A photoelectric smoke detector is developed by utilizing the basic nature that smoke produced in fire can change the transmission characteristics of light. When the concentration of smoke reaches a certain degree, the photoelectric smoke detector sends out an alarm signal. The photoelectric fire detection technology is employed to detect smoke, and the optical scattering intensity model of smoke particles is established under the Miller scattering principle so as to measure the total scattering (absorption and scattering) of smoke particles with regard to incident light of different wavelengths. The formula for calculating the Miller scattering parameter that determines the scattering intensity is $q=4\pi d\lambda-1 \sin(\theta/2)$, where the scattering intensity is in direct proportion to the particle diameter d and in inverse proportion to the wavelength of the incident light.

Different materials produce different types of smoke in the process of fire (pyrolysis or smoldering). In the early stage of fire, easily produced are a smaller number of relatively large particles, which can age and condense into larger translucent spherical suspending particles. Smoke particles generated under non-fire conditions, such as dust and water vapor, are produced by natural substances in the environment, instead of pyrolysis, which are usually larger than the smoke particles produced in fire. Because the traditional technology is based on the number of particles which serve as a characteristic to determine whether a fire takes place, the types of fire smoke and non-fire smoke cannot be distinguished by using a single light source to detect the intensity of light in a detection area. Furthermore, there is a high rate of false alarm among the existing smoke detectors. With regard to repeated false alarm from the alarms, people have a psychological shadow, so that they would have been mentally slack even when fire really comes, thereby giving a significant impact on people's life.

Most of the existing detectors are based on the method solely related to smoke concentration, which cannot solve such problems as low rate of false alarm, wide-spectrum response to smoke particle size, uniform response to both black and white smoke, and adjustable sensitivity.

Fire smoke has different characteristics of the distribution of particle sizes from non-fire smoke (water vapor/dust, etc.). By using the nature that the particle diameter of smoke shows distinction in scattering intensity with regard to different wavelengths of the incident light, the current problem about determination of fire solely based on smoke concentration can be solved, and fire smoke and non-fire smoke can be distinguished. Meanwhile, the problem about uniform response to both black and white smoke can be solved by using the nature that smoke particles in different colors are different in absorption of light incident at different angles.

The contents in the Background just disclose the technologies known to the inventors rather than surely represent the prior art in the field.

SUMMARY

In view of one or more of the defects existing in the prior art, the present invention provides a smoke detector comprising a body, having a detection chamber therein; a first transmitting tube and a second transmitting tube, arranged in the body and configured to be capable of transmitting a first ray of light and a second ray of light into the detection chamber, respectively; a receiving tube, where the first ray of light and the second ray of light can be incident after refraction and/or scattering, and which generates outputs according to the intensity of incident light; and a control device, coupled with the receiving tube to receive a first output generated by the first ray of light on the receiving tube and a second output generated by the second ray of light on the receiving tube, and configured to determine whether there is a fire based on a difference or ratio between the first output and the second output, or the combination thereof.

In accordance with one aspect of the present invention, the smoke detector further comprises an alarm device coupled with the control device, and is triggered to alarm when the control device determines there is a fire.

In accordance with one aspect of the present invention, the first transmitting tube is encapsulated with a first group of light sources having a plurality of wavelengths, the second transmitting tube is encapsulated with a second group of light sources having a plurality of wavelengths, and the control device is configured to determine whether there is a fire based on a plurality of first outputs generated on the receiving tube by light having a plurality of wavelengths from the first group of light sources, and a plurality of second outputs generated on the receiving tube by light having a plurality of wavelengths from the first group of light sources, wherein the first transmitting tube is preferably encapsulated with three LEDs different in wavelength, and the second transmitting tube is preferably encapsulated with three LEDs different in wavelength.

In accordance with one aspect of the present invention, the first transmitting tube is an infrared transmitting tube, and the second transmitting tube is a blue-ray transmitting tube.

In accordance with one aspect of the present invention, the control device is configured to control the first transmitting tube and the second transmitting tube and determine whether there is a fire in the following ways: lighting the first transmitting tube, emitting the first ray of light, and collecting the first output generated by the receiving tube based on the first ray of light; lighting the second transmitting tube, emitting the second ray of light, and collecting the second output generated by the receiving tube based on the second ray of light; and determining whether the first output exceeds a first threshold value; determining that there is a fire if the first output exceeds a first threshold value, otherwise determining whether the first output exceeds a second threshold value; and then determining that there is no fire if the first output does not exceed the second threshold value.

In accordance with one aspect of the present invention, the control device is configured to determine whether the second output exceeds a third threshold value if the first output exceeds the second threshold value; to determine that there is a fire if the second output exceeds the third threshold value, otherwise to determine whether the first output and the second output conform to a fire mode in the database; and to determine that there is a fire if the first output and the second output conform to a fire mode in the database, wherein the time for lighting the first transmitting tube is 70-90 us, preferably 80 us, and the time for lighting the second transmitting tube is 70-90 us, preferably 80 us.

In accordance with one aspect of the present invention, the included angle between the first transmitting tube and the receiving tube in the horizontal plane is 121°-147°, and the included angle between the second transmitting tube and the receiving tube in the horizontal plane is 60°-91°.

The present invention further provides a smoke detection method, comprising: lighting a first transmitting tube, emitting a first ray of light, and allowing refracted and/or scattered smoke to be incident onto a receiving tube to generate a first output; lighting a second transmitting tube, emitting a second ray of light, and allowing refracted and/or scattered smoke to be incident onto the receiving tube to generate a second output; and determining whether there is a fire based on a difference or ratio between the first output and the second output, or the combination thereof.

In accordance with one aspect of the present invention, the smoke detection method further comprises: triggering the alarm when determining that there is a fire.

In accordance with one aspect of the present invention, the first transmitting tube is encapsulated with a first group of light sources having a plurality of wavelengths, the second transmitting tube is encapsulated with a second group of light sources having a plurality of wavelengths, and the step of determining whether there is a fire comprises: determining whether there is a fire based on a plurality of first outputs generated on the receiving tube by light having a plurality of wavelengths from the first group of light sources, and a plurality of second outputs generated on the receiving tube by light having a plurality of wavelengths from the first group of light sources, wherein the first transmitting tube is preferably encapsulated with three LEDs different in wavelength, and the second transmitting tube is preferably encapsulated with three LEDs different in wavelength.

In accordance with one aspect of the present invention, the step of determining whether there is a fire comprises: determining whether the first output exceeds a first threshold value; determining that there is a fire if the first output exceeds the first threshold value, otherwise determining whether the first output exceeds a second threshold value; determining that there is no fire if the first output does not exceed the second threshold value, and determining whether the second output exceeds a third threshold value if the first output exceeds the second threshold value; determining that there is a fire if the second output exceeds the third threshold value, otherwise determining whether the first output and the second output conform to a fire mode in the database; and determining that there is a fire if the first output and the second output conform to a fire mode in the database, wherein the time for lighting the first transmitting tube is 70-90 us, preferably 80 us, and the time for lighting the second transmitting tube is 70-90 us, preferably 80 us.

In accordance with one aspect of the present invention, the smoke detection method is executed by the smoke detector as described above.

By the examples of the present invention, smoke detection and alarm can be carried out in a more precise manner, thereby solving such problems as low rate of false alarm, wide-spectrum response to smoke particle size, uniform response to both black and white smoke, and adjustable sensitivity that cannot be solved by most of the existing detectors based on the method solely related to smoke concentration.

BRIEF DESCRIPTION OF THE DRAWINGS

As a part of the present invention, the accompanying drawings are provided for the purpose of further understanding of the present invention, and the illustrative examples of the present invention and the detailed description thereof serve to explain the present invention, which should not constitute any improper limitation on the present invention. In the drawings.

DETAILED DESCRIPTION

Figure 1:
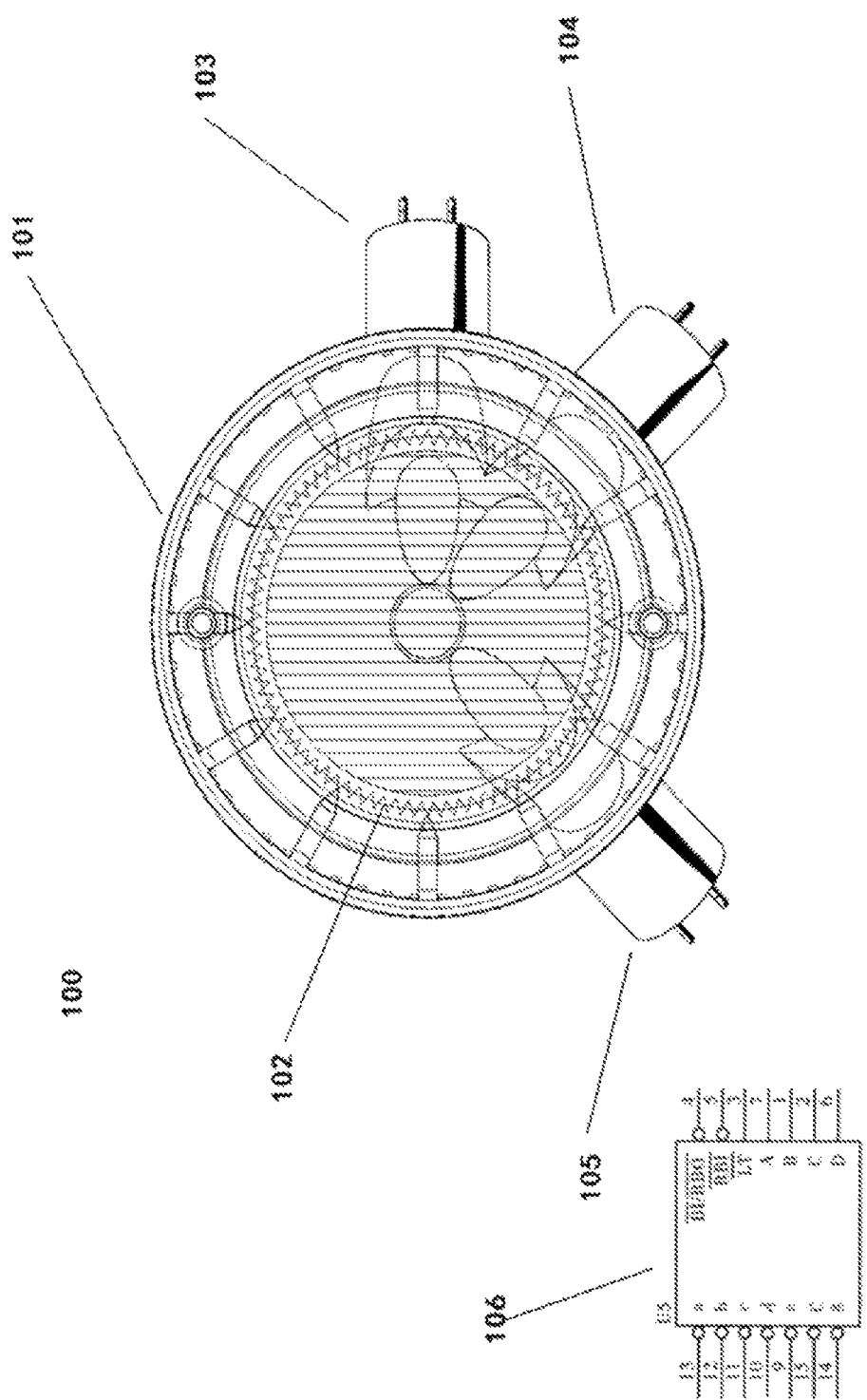
FIG. 1 shows a smoke detector in accordance with one example of the present invention.

The following exemplary embodiments will be described only in a brief manner. Just as those skilled in the art will recognize that changes in various ways to the examples described herein can be carried out without departing from the spirit or scope of the present invention. Therefore, the drawings and description are deemed substantively exemplary, instead of limitative.

In the description of the present invention, it need be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position as shown in the accompanying drawings, and only used for the purpose of facilitating description for the present invention and simplification of the description, instead of indicating or suggesting that the denoted devices or elements must be specifically oriented, or configured or operated in some specific orientation. Thus, such terms should not be construed to limit the present invention. In addition, such terms as "first" and "second" are only used for the purpose of description, rather than indicating or suggesting relative importance or implicitly indicating the number of the designated technical features. Accordingly, features defined with "first" or "second" may, expressly or implicitly, include one or more of such features. In the description of the present invention, "more" means two or above, unless otherwise defined explicitly and specifically.

In the description of the present invention, it needs to be specified that, unless otherwise specified and defined explicitly, such terms as "mount" "link" and "connect" should be understood as generic terms. For example, connection may refer to fixed connection, dismountable connection, or integrated connection; also to mechanical connection, electric connection or intercommunication; further to direct connection, or connection by an intermediary medium; or even to internal communication between two elements or interaction between two elements. For those skilled in the art, they can construe the specific meaning of such terms herein in light of specific circumstances.

Herein, unless otherwise specified and defined explicitly, if a first feature is "above" or "below" a second one, it may cover the direction contact between the first and second features, also cover the contact via another feature therebetween, instead of the direct contact. Furthermore, if a first feature "above", "over" or "on the top of" a second one, it may cover that the first feature is right above or on the inclined top of the second feature, or just indicate that the first feature has a horizontal height higher than that of the second feature. If a first feature is "below", "under" or "on the bottom of" a second feature, it may cover that the first feature is right below and on the inclined bottom of the second feature, or just indicates that the first feature has a horizontal height lower than that of the second feature.

The disclosure below provides many different embodiments and examples for achieving different structures described herein. In order to simplify the disclosure herein, the following will give the description of the parts and arrangements embodied in specific examples. Surely, they are just for the exemplary purpose, not intended to limit the present invention. Besides, the present invention may repeat a reference number and/or reference letter in different examples, and such repeat is for the purpose of simplification and clarity, and itself denotes none of the relations among various embodiments and/or arrangements as discussed. In addition, the present invention provides examples for a variety of specific techniques and materials, but the common skilled persons in the art are aware of an application of other techniques and/or a use of other materials.

The following description, along with the accompanying drawings, sets forth the preferable examples herein. It should be understood that the preferable examples described herein are only for the purpose of illustrating and explaining, instead of limiting, the present invention.

FIG. 1 shows a smoke detector 100 in accordance with one example of the present invention. As shown in FIG. 1, the smoke detector 100 comprises a body 101, a first transmitting tube 103, a second transmitting tube 104, a receiving tube 105 and a control device 106. The body 101 has a detection chamber 102 therein. Detection chamber 102, also referred to as a dark chamber or a smoke-sensing labyrinth, not only allows external smoke to enter inside, but also can block external ambient light, thereby making the interior a dark chamber and preventing the interference of the external ambient light. At the same time, a zigzag design can be provided inside detection chamber 102 to effectively absorb the background light.

Both the first transmitting tube 103 and the second transmitting tube 104 can be arranged in the body 101 and configured to be capable of emitting a first ray of light and a second ray of light into the detection chamber 102, respectively. The first ray of light and the second ray of light, after refracted and/or scattered by smoke particles in the detection chamber, can be incident into the receiving tube 105, and the receiving tube 105 generates outputs according to the intensity of the incident light such that the concentration of the smoke particles or other information can be gained according to the outputs. The receiving tube 105 is, for example, a photosensitive diode. A photosensitive diode can convert light signals into current or voltage signals. The die of the diode uses a PN junction with photosensitive characteristics, which is very sensitive to the change in light and has unilateral conductivity. Furthermore, the die will change the electrical characteristics at different intensities of light, and the light intensity can be smoothly used to change the current in the circuit. When smoke particles block the photosensitive diode from receiving light, very small saturation current and reverse leakage current are generated, and the photodiode is cut off by then; and when there are no smoke particles blocking the photosensitive diode, the diode receives light, and the saturation reverse leakage current greatly increases to form photocurrents, and then changes along with the change of the intensity of incident light, so that the diameter of the smoke particles can be determined according to the strength of the current. Those skilled in the art can understand that the outputs of the receiving tube 105 can reflect the concentration of smoke, and no more description will be made here.

The control device 106 is coupled, in communication, with the receiving tube 105 to receive a first output generated by the first ray of light on the receiving tube and a second output generated by the second ray of light on the receiving tube, and is configured to determine whether there is a fire based on a difference or ratio or combination of the first output and the second output. For the sake of clarity, the control device 106 in FIG. 1 is shown outside the body 101 of the smoke detector 100, but it can be understood by those skilled in the art that the control device 106 can be either integrated into the body of the smoke detector 100, or arranged as a separate unit; or one control device 106 can simultaneously be in communication with a plurality of smoke detectors 100, and collect the outputs from the receiving tubes to carry out smoke detection and fire alarm, all of which fall within the scope of the present invention. The control device can be achieved by means of software, hardware, or the combination of software and hardware. For example, it can be a single-chip microcomputer, a microprocessor, a microcontroller, a digital signal processor, an application specific integrated circuit (ASIC), a field programmable gate array (FPGA) or other integrated formats, all of which fall within the scope of the present invention.

The control device 106 may also be coupled with the first transmitting tube 103 and the second transmitting tube 104 so as to control the first transmitting tube 103 and the second transmitting tube 104 in respect of illumination, lighting and illumination time, and timing sequence.

In accordance with one preferable example of the present invention, the smoke detector 100 further comprises an alarm device (not shown). The alarm device is coupled with the control device 106, and triggered to alarm when the control device determines that there is a fire. The alarm device is, for example, a buzzer or a flash, or sends to a user an alarm message on a graphical user interface.

Preferably, the first transmitting tube 103 and the second transmitting tube 104 are transmitting tubes of different wavelengths. For example, the first transmitting tube 103 is an infrared transmitting tube, and the second transmitting tube 104 is a blue-ray transmitting tube.

Figure 2:
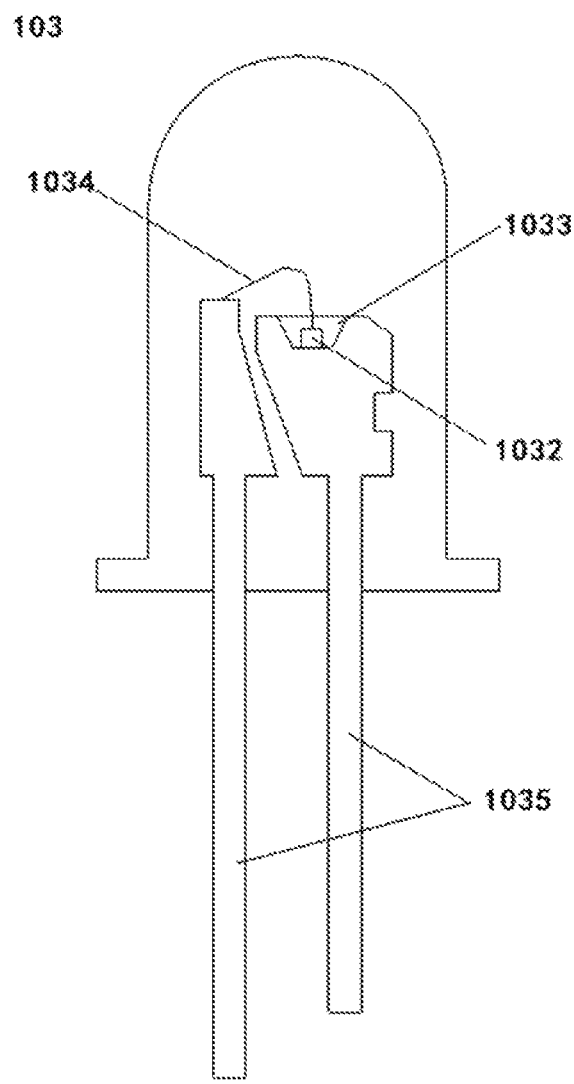
FIG. 2 shows one preferable example of a first transmitting tube.

In accordance with one preferable example of the present invention, the first transmitting tube 103 encapsulates a first group of light sources having a plurality of wavelengths, the second transmitting tube 104 encapsulates a second group of light sources having a plurality of wavelengths, and the control device 106 is configured to determine whether there is a fire based on a plurality of first outputs generated on the receiving tube by light having a plurality of wavelengths from the first group of light sources, and a plurality of second outputs generated on the receiving tube by light having a plurality of wavelengths from the first group of light sources. FIG. 2 shows one preferable example of the first transmitting tube 103, wherein the first transmitting tube 103 encapsulates three LEDs different in wavelength.

As shown in FIG. 2, the first transmitting tube 103 comprises a refection cup 1033 for reflecting the light emitted by a LED chip 1032 to the receiving tube, and the LED chip 1032 is arranged inside the reflection cup 1033 and leads out the P-junction of LED chip 2 through a gold wire 1034, the N-junction of the LED chip 1032 is connected with the reflection cup 1033. Two terminals 1035 for wiring are provided on the lower end of the first transmitting tube 103, and the terminals 1035 for wiring can be connected with a power source and a switch to achieve the power supply or power-off for the LED chip.

Figure 3:
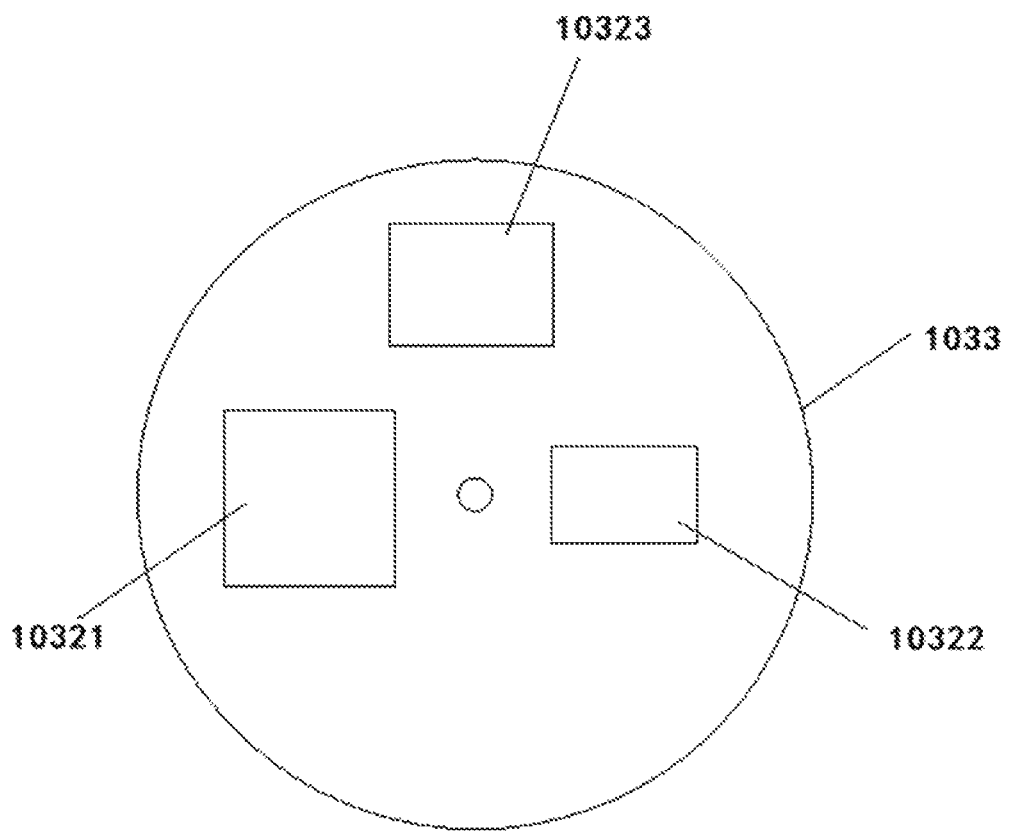
FIG. 3 is a schematic of a LED chip in accordance with one example of the present invention.

FIG. 3 is a schematic of the LED chip 1032. As shown in FIG. 3, the LED chip 1032 comprises a first LED chip 10321, a second LED chip 10322 and a third LED chip 10323. The three LED chips are arranged apart. The light emitted by the three LED chips has different wavelengths, for example, the infrared wavelength being about 940 nm, the blue wavelength being 460 nm, and the green wavelength being 510 nm.

A lens can be provided inside the first transmitting tube 103, and the lens is arranged above the LED chip 1032. With the lens elongated, the angle of focus can be increased. The lens is made of PMMA, PC, optical glass, silica gel and other materials. The larger the angle, the higher the luminous efficiency. By a small-angle lens can light be emitted far.

In addition, it is mostly in the prior art that the internal structure of the smoke chamber (i.e. labyrinth) is modified to enhance the alarm accuracy of a smoke detector. While in the examples of the present invention, the accuracy and sensitivity of the smoke detector can be improved by integrating a plurality of LED chips having different wavelengths onto a single LED lamp bead 1 of the transmitting tube. This improvement is convenient and low-cost in the process of implementation, and thus the alarm accuracy of a smoke detector can be improved when there is no need to carry out too much modification to the internal structure of a smoke chamber (i.e. labyrinth). In addition, by comparison between the encapsulated chip of multiple wavelengths and the encapsulated chip of a single wavelength, the smoke detector saves the cost in module.

Described above is the structure of the first transmitting tube 103. And the second transmitting tube 104 may be constructed in a similar structure, preferably encapsulates three LEDs different in wavelength. The wavelengths of the second transmitting tube 104 are preferably different from those of the first transmitting tube 103.

In accordance with one preferable example of the present invention, the first transmitting tube 103, the second transmitting tube 104 and the receiving tube are arranged in the same plane, and the included angle between the first transmitting tube 103 and the receiving tube 105 is between 121° and 147°, and the included angle between the second transmitting tube 104 and the receiving tube 105 is between 60° and 91°.

With regard to the second transmitting tube, the aforesaid range for the angle between the second transmitting tube 104 and the receiving tube 105 can effectively reduce the noise. For example, a comparison is made in respect of the noise of the light received by the receiving tube between a smaller angle, like 45°, and an angle in the aforesaid range, like 85°. In the simulated ray tracing mode, the number of rays can represent the intensity of light directly incident into the receiving tube, and the light intensity that is directly reflected from the incident light into the receiving tube belongs to noise. The simulation results show that the noise values are 1.09e−07 at 85° and 6.38e−07 at 45°, and the latter is about six times as much as the former. Therefore, the angle range of the present invention can effectively reduce the noise of the receiving tube and improve the accuracy of smoke alarm. The same principle is applicable to the angle between the first transmitting tube and the receiving tube, and the angle range of the present invention can effectively lower the level of noise of the receiving tube.

In the present invention, the first transmitting tube and the second transmitting tube may be a monochromatic light-emitting tube, such as an infrared light-emitting tube/blue light-emitting tube, or a composite light-emitting tube, such as an infrared-and-blue-ray-composite light-emitting tube.

In FIG. 3, three LED chips are described as an example, but the present invention is not limited to this. The first transmitting tube 103 and the second transmitting tube 104 may also include LED chips in other numbers, such as 2, 4, 5 and more LED chips, all of which fall within the scope of the present invention.

A method 400 for detecting smoke according to one preferable example of the present invention will be described below with reference to FIG. 4.

Figure 4:
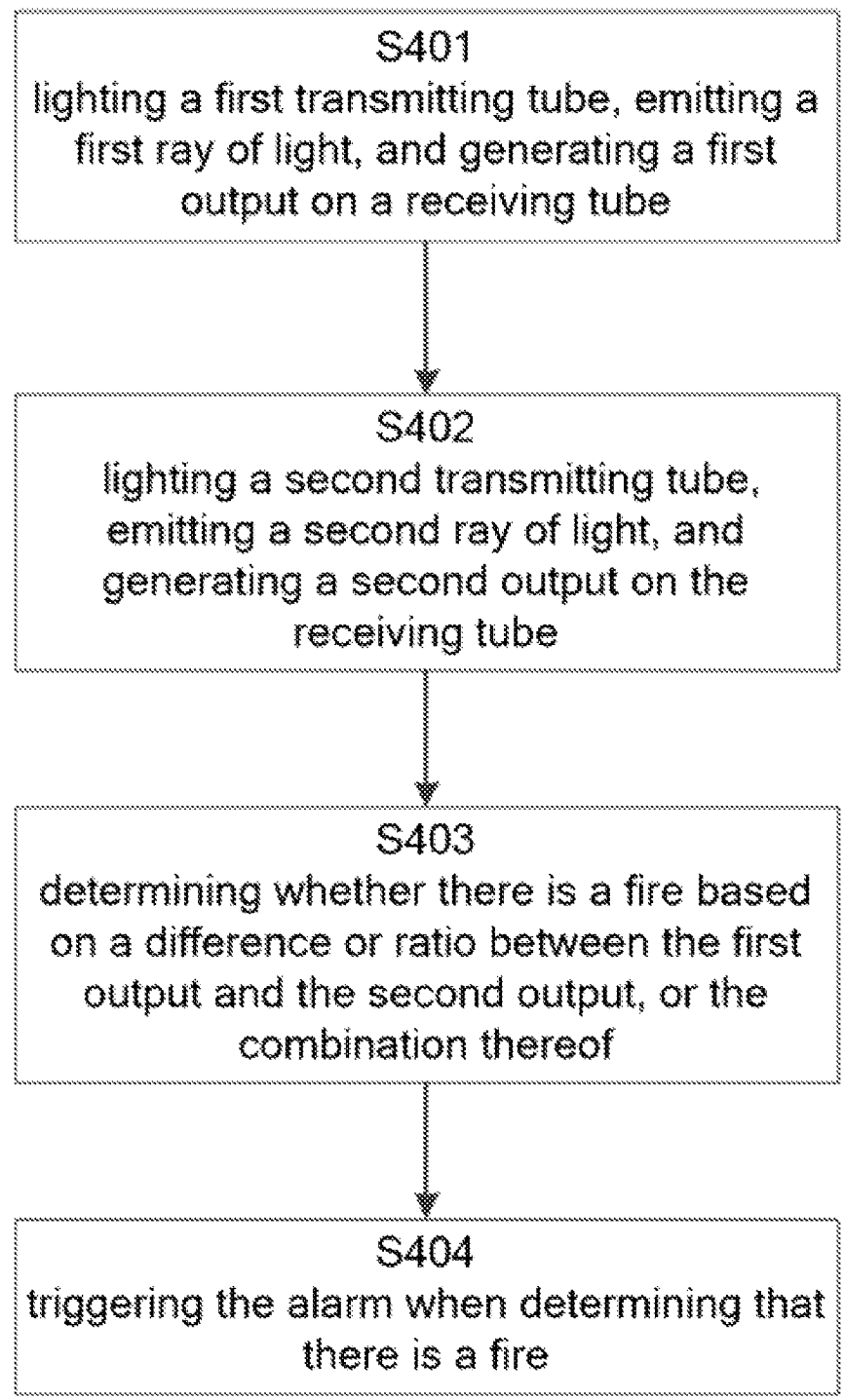
FIG. 4 shows a method for detecting smoke in accordance with one preferable example of the present invention.

As shown in FIG. 4, at step S401, the first transmitting tube is lighted, and the first ray of light is emitted and, after refracted and/or scattered by smoke, is incident into the receiving tube to generate a first output F_IR.

At step S402, the second transmitting tube is lighted, and the second ray of light is emitted and, after refracted and/or scattered by smoke, is incident into the receiving tube to generate a second output B_BL; and At step S403, it is determined whether there is a fire based on a difference or ratio or the combination between the first output and the second output.

The order of steps S401 and S402 therein does not constitute a limitation on the present invention. The steps may be carried out in the order of S401 and S402, or in the order of S402 and S401, or both may be carried out at the same time, all of which fall within the scope of the invention. Since the luminous wavelengths of the first transmitting tube and the second transmitting tube can be distinguished, they can also be distinguished by the wavelengths on the receiving tube. Therefore, the technical solution of the present invention can be realized regardless of order.

At step S404, the alarm will be triggered when a fire is determined. The alarm can be provided by means of sound, light, image or any combination thereof.

Figure 5:
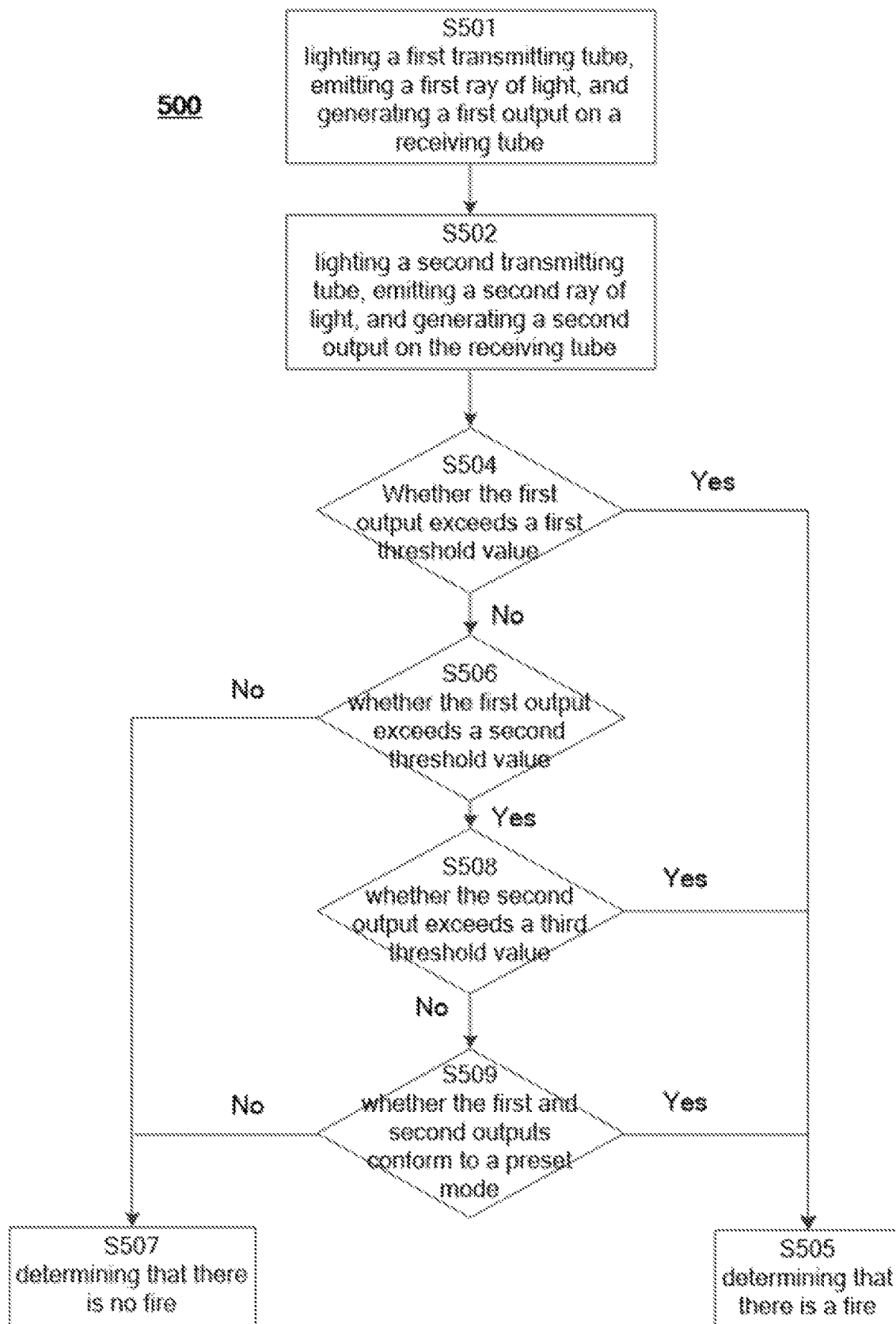
FIG. 5 shows a method for detecting smoke in accordance with an alternative preferable example of the present invention.

A method 500 for detecting smoke according to one preferable example of the present invention will be described below with reference to FIG. 5. The smoke detection method 500 may be implemented by the smoke detector 100 as described herein above.

At step S501, the first transmitting tube is lighted for a period of time, the first ray of light is emitted, and the first output (the infrared scattering smoke sensing value F_IR) from the receiving tube is collected. The first transmitting tube is, for example, an infrared transmitting tube.

At step S502, the second transmitting tube is lighted for a period of time, the second ray of light is emitted, and the second output (the blue-ray scattering smoke sensing value B_BL) from the receiving tube is collected. The second transmitting tube is, for example, a blue-ray transmitting tube of a different wavelength from the first transmitting tube. Similarly, the present invention is not limited to the order of steps S501 and S502 as both can be carried out successively or simultaneously, and any case should fall within the protection scope of the present invention.

At steps S501 and S502, the time for the lighting and illumination of the first and second transmitting tubes can be 70-90 us, preferably 80 us.

At step S504, it is determined whether the first output (the red-ray scattering smoke sensing value F_IR) exceeds a predefined maximum alarm threshold absolute value (a first threshold value). In this example, the first threshold value is, for example, 200. If the first output exceeds the first threshold value, it is determined that there is a fire (step S505), and the fire alarm raises the alarm; and if not so, step S506 goes on to determine whether the first output F_IR exceeds a multichannel sampling determination threshold value (a second threshold value). In this example, the absolute value of the second threshold value is, for example, 30. If the first output does not exceed the second threshold value, it is determined that there is no fire (step S507), and the detection algorithm completes; while if the first output exceeds the second threshold value, step S508 continues so as to determine whether the second output (the blue-ray scattering smoke sensing value B_BL) meets the requirement of being greater than a third threshold value (for example, 90 in this example); if it is determined that the second output is greater than the third threshold value, step S505 is in progress to determine that there is a fire and the alarm is raised; while if the second output is not greater than the third threshold value, then step S509 goes on to determine whether the first output and the second output match a preset fire mode. If a preset fire mode is determined as matched, then it is determined that there is a fire (step S505) and the alarm is raised; while if not matched, and the equipment is in normal operation, then it is determined that there is no fire (step S507).

In accordance with one preferable example of the present invention, the first transmitting tube encapsulates a first group of light sources having a plurality of wavelengths, the second transmitting tube encapsulates a second group of light sources having a plurality of wavelengths, and the step of determining whether there is a fire comprises: determining whether there is a fire based on a plurality of first outputs generated on the receiving tube by light having a plurality of wavelengths from the first group of light sources, and a plurality of second outputs generated on the receiving tube by light having a plurality of wavelengths from the first group of light sources, wherein the first transmitting tube preferably encapsulates three LEDs different in wavelength, and the second transmitting tube preferably encapsulates three LEDs different in wavelength. The emitting wavelengths of the LEDs are different from each other.

Described below is a determination method by combination of the first output and the second output and based on a preset fire mode according to one preferable example of the present invention.

In the common application scenarios, different burning materials and different types of interference sources will correspondingly modulate the incident light at different angles and of different wavelengths. Therefore, the training data signature of fire recognition can be established with regard to typical scenes such as burning materials and interference sources. The corresponding training data signature form is shown, for example, in Table 1 below. Through a large number of simulated combustion experiments, Table 1 can be established.

TABLE 1

| Signal matrix under typical combustion | Real fire | | | | Interference sources | | |
|---|---|---|---|---|---|---|---|
| condition and concentration | Wood pyrolysis | Open fire in wood | Polyurethane plastics | Smoldering in cotton strings | Water vaper | Cooking | Dust |
| Emission angle 1 Wavelength 1 | 91 | 92 | 82 | 98 | 140 | 80 | 110 |
| Emission angle 1 Wavelength 2 | 86 | 87 | 80 | 92 | 144 | 78 | 112 |
| Emission angle 1 Wavelength 3 | 88 | 90 | 85 | 100 | 130 | 83 | 105 |
| Emission angle 2 Wavelength 1 | 86 | 90 | 73 | 97 | 129 | 83 | 100 |
| Emission angle 2 Wavelength 2 | 88 | 91 | 70 | 99 | 120 | 80 | 105 |
| Emission angle 2 Wavelength 3 | 84 | 93 | 71 | 95 | 139 | 84 | 103 |

Two light-emitting tubes are illustrated as an example in Table 1, either of which contains three light sources, such as the light-emitting tubes shown in FIG. 3. In addition, the values in Table 1 are illustratively listed for reference only. Under different experimental conditions, such as different wavelengths, different angles, and different shapes of detection chambers, etc., there will be different signal strengths.

The angle of emission corresponding to the first transmitting tube is, for example, emission angle 1, in which there are light sources of three wavelengths, the wavelengths including wavelength 1, wavelength 2 and wavelength 3, respectively. The angle of emission corresponding to the second transmitting tube is, for example, emission angle 2, in which there are light sources of three wavelengths, the wavelengths including wavelength 1, wavelength 2 and wavelength 3, respectively (preferably, different from the three wavelengths of the first transmitting tube). When a fire detection method is operating on a sensor or control device, measurement signals of different channels (emission angle 1 wavelength 1, emission angle 1 wavelength 2, emission angle 1 wavelength 3, . . . emission angle n wavelength 1, emission angle n wavelength 2, emission angle n wavelength 3) will be collected regularly. After the signal data of each channel are collected, real-time processing is carried out on the data, and the relevant operation analysis is performed based on the fire training signature. The output result of the operation is fire or non-fire. In consideration of the optimization of power consumption, only when the test signal monitored in one channel exceeds the preset threshold value can the collection of signals in more channels be started, which can optimize the signal collection which requires higher power consumption.

After the first transmitting tube and the second transmitting tube are lit up and become luminous respectively, the refracted/scattered light of different wavelengths will be received on the receiving tube, and which of the transmitting tubes it comes from can be distinguished according to the difference in wavelength. During the operation of the smoke sensor, it can further determine, in a more precise manner, whether a fire occurs, and even determine the type of the burning materials in the fire, according to the relevant parameters of the incident light received by the receiving tube and the wavelengths thereof as compared with the training data signature form in Table 1.

Certainly, in the process of comparison, the measured parameters may not strictly match the training data signature form in Table 1. In this case, such techniques as mode recognition and data classification can be employed to determine which type of burning materials or interference sources is the closest to the current measured parameters. All of these are within the protection scope of the present invention.

Table 1 is directed to the recognition of a burning material and/or interference source according to a combination of a plurality of first outputs and a plurality of second outputs generated on the receiving tube by the refracted and/or scattered light beams of various wavelengths from the first and second transmitting tubes. However, the present invention is not limited to this. Determination can also be made by the difference between the first output and the second output, i.e., F_IR−B_BL, and/or the ratio of the first output to the second output, i.e., F_IR/B_BL. The train of thinking to achieve so is similar to Table 1. The typical value of the difference and ratio between the first output and the second output under the condition of typical burning materials and interference sources can be obtained through the simulated fire experiment. Then, in the process of actual operation, the measured value and the typical value are compared and matched to determine whether there is a fire, distinguish the types of burning materials and interference sources, and reduce the rate of false alarm.

Illustrated above is an example of two transmitting tubes with three LEDs respectively. The present invention can also be achieved in other ways. For example, the first and second transmitting tubes are a single wavelength transmitting tube, for example, encapsulating a LED of a single wavelength, located at different angles of emission and having different wavelengths (for example, the first transmitting tube is an infrared transmitting tube, and the second transmitting tube is a blue-ray transmitting tube). In this case, the receiving tube then includes two channels of measurement signals: emission angle 1 wavelength 1, and emission angle 2 wavelength 2. The training data signature form will be simplified into a two-line matrix. All of these are within the scope of the present invention.

By the examples of the present invention, smoke detection and alarm can be carried out in a more precise manner, thereby solving such problems as low rate of false alarm, wide-spectrum response to smoke particle size, uniform response to both black and white smoke, and adjustable sensitivity that cannot be solved by most of the existing detectors based on the method solely related to smoke concentration.

Described above are some preferable examples of the present invention only, which are not used to limit the present invention. Any modification, equivalent replacement, improvement, etc. made within the spirit and principles of the present invention should be included in the protection scope of the present invention.

Last but not least, the contents described above are just preferable examples of the present invention, and are not used to limit the present invention. Although the detailed description of the present invention has been provided with reference to the foregoing examples, those skilled in the art still may make modifications to the technical solutions recorded in various examples described above, or conduct equivalent replacement of part of technical features therein. Any modification, equivalent replacement, improvement, if only within the spirit and principles set out herein, should be covered by the protection scope of the present invention.

We claim:

1. A smoke detector, comprising:
   a body, having a detection chamber therein;
   a first transmitting tube and a second transmitting tube, arranged in the body and configured to be capable of transmitting a first ray of light and a second ray of light into the detection chamber respectively, wherein the first transmitting tube is an infrared transmitting tube, and wherein the second transmitting tube has a different light wavelength from that of the first transmitting tube;
   a receiving tube, where the first ray of light and the second ray of light can be incident after refraction and/or scattering, wherein the receiving tube generates a first output generated by the first ray of light on the receiving tube, and wherein the receiving tube generates a second output generated by the second ray of light on the receiving tube; and
   a control device, coupled with the receiving tube to receive the first output and the second output, and configured to determine whether there is a fire based on a difference, ratio or combination between the first output and the second output,
   wherein the control device is configured to further determine whether there is a fire by:
      determining that there is a fire if the first output exceeds a first threshold value;
      determining that there is no fire if the first output does not exceed a second threshold value;
      determining that there is a fire if the second output exceeds a third threshold value if the first output exceeds the second threshold value; and
      determining that there is a fire if the second output does not exceed the third threshold value but the first output and the second output conform to a fire mode in a training set.

2. The smoke detector according to claim 1, further comprising an alarm device, coupled with the control device and triggered to alarm when the control device determines there is a fire.

3. The smoke detector according to claim 1, wherein the first transmitting tube encapsulates a first group of light sources having a plurality of wavelengths, the second transmitting tube encapsulates a second group of light sources having a plurality of wavelengths, and the control device is configured to determine whether there is a fire based on a plurality of first outputs generated on the receiving tube by light having a plurality of wavelengths from the first group of light sources, and a plurality of second outputs generated on the receiving tube by light having a plurality of wavelengths from the second group of light sources.

4. The smoke detector according to claim 1, wherein the second transmitting tube is a blue-ray transmitting tube.

5. The smoke detector according to claim 4, wherein the control device is configured to control the first transmitting tube and the second transmitting tube and determine whether there is a fire by:
lighting the first transmitting tube, emitting the first ray of light, and collecting the first output generated by the receiving tube based on the first ray of light; and
lighting the second transmitting tube, emitting the second ray of light, and collecting the second output generated by the receiving tube based on the second ray of light.

6. The smoke detector according to claim 5,
wherein the first transmitting tube is lighted for 70-90 us, and the second transmitting tube is lighted for 70-90 us.

7. The smoke detector according to claim 1, wherein an included angle between the first transmitting tube and the receiving tube in a horizontal plane is 121°-147°, and an included angle between the second transmitting tube and the receiving tube in the horizontal plane is 60°-91°.

8. The smoke detector according to claim 3, wherein the first transmitting tube encapsulates three LEDs different in wavelength, and the second transmitting tube encapsulates three LEDs different in wavelength.

9. The smoke detector according to claim 6, wherein the first transmitting tube is lighted for 80 us, and the second transmitting tube is lighted for 80 us.

10. A method for detecting smoke, comprising:
lighting a first transmitting tube comprising an infrared transmitting tube, emitting a first ray of light, and allowing the first ray of light to be incident onto a receiving tube after being refracted and/or scattered by smoke, to generate a first output;
lighting a second transmitting tube having a different light wavelength from that of the first transmitting tube, emitting a second ray of light, and allowing the second ray of light to be incident onto the receiving tube after being refracted and/or scattered by smoke, to generate a second output;
determining whether there is a fire based on a difference, ratio or combination between the first output and the second output; and
further determining whether there is a fire by:
determining that there is a fire if the first output exceeds a first threshold value;
determining that there is no fire if the first output does not exceed a second threshold value;
determining that there is a fire if the second output exceeds a third threshold value if the first output exceeds the second threshold value; and
determining that there is a fire if the second output does not exceed the third threshold value but the first output and the second output conform to a fire mode in a training set.

11. The smoke detection method according to claim 10, further comprising:
triggering an alarm when determining that there is a fire.

12. The smoke detection method according to claim 10, wherein the first transmitting tube encapsulates a first group of light sources having a plurality of wavelengths, the second transmitting tube encapsulates a second group of light sources having a plurality of wavelengths, and the step of determining whether there is a fire comprises: determining whether there is a fire based on a plurality of first outputs generated on the receiving tube by light having a plurality of wavelengths from the first group of light sources, and a plurality of second outputs generated on the receiving tube by light having a plurality of wavelengths from the second group of light sources.

13. The smoke detection method according to claim 10, wherein the first transmitting tube is lighted for 70-90 us, and the second transmitting tube is lighted for 70-90 us.

14. The smoke detection method according to claim 12, wherein the first transmitting tube encapsulates three LEDs different in wavelength, and the second transmitting tube encapsulates three LEDs different in wavelength.

15. The smoke detection method according to claim 13, wherein the first transmitting tube is lighted for 80 us, and the second transmitting tube is lighted for 80 us.

16. The smoke detection method according to claim 10, wherein the method is executed by the smoke detector comprising:
a body, having a detection chamber therein;
the first transmitting tube and the second transmitting tube, arranged in the body and configured to be capable of transmitting the first ray of light and the second ray of light into the detection chamber respectively;
the receiving tube, where the first ray of light and the second ray of light can be incident after refraction and/or scattering, wherein the receiving tube generates a first output generated by the first ray of light on the receiving tube, and wherein the receiving tube generates a second output generated by the second ray of light on the receiving tube; and
a control device, coupled with the receiving tube to receive the first output and the second output, and configured to determine whether there is a fire based on the difference, ratio or combination between the first output and the second output.

17. The smoke detection method according to claim 16, wherein the method is executed by the smoke detector further comprising an alarm device that is coupled with the control device and triggered to alarm when the control device determines there is a fire.

18. The smoke detector according to claim 10, wherein the first transmitting tube is an infrared transmitting tube, and the second transmitting tube is a blue-ray transmitting tube.

19. The smoke detector according to claim 10, wherein an included angle between the first transmitting tube and the receiving tube in a horizontal plane is 121°-147°, and an included angle between the second transmitting tube and the receiving tube in the horizontal plane is 60°-91°.

20. An apparatus for detecting smoke, comprising:
means for lighting a first transmitting tube having a first light wavelength, emitting a first ray of light, and allowing the first ray of light to be incident onto a receiving tube after being refracted and/or scattered by smoke, to generate a first output;
means for lighting a second transmitting tube having a different light wavelength from that of the first transmitting tube, emitting a second ray of light, and allowing the second ray of light to be incident onto the receiving tube after being refracted and/or scattered by smoke, to generate a second output; and
means for i) determining whether there is a fire based on a difference, ratio or combination between the first output and the second output and ii) further determining whether there is a fire by:

determining that there is a fire if the first output exceeds a first threshold value;

determining that there is no fire if the first output does not exceed a second threshold value; and determining that there is a fire if the second output exceeds a third threshold value if the first output exceeds the second threshold value; and determining that there is a fire if the second output does not exceed the third threshold value but the first output and the second output conform to a fire mode in a training set.

* * * * *